(12) United States Patent
Ginsberg-Klemmt et al.

(10) Patent No.: US 12,040,737 B2
(45) Date of Patent: Jul. 16, 2024

(54) ELECTRICITY GENERATING CARPORT APPLIANCE

(71) Applicants: Antonia Ginsberg-Klemmt, Sarasota, FL (US); Achim Ginsberg-Klemmt, Sarasota, FL (US)

(72) Inventors: Antonia Ginsberg-Klemmt, Sarasota, FL (US); Achim Ginsberg-Klemmt, Sarasota, FL (US)

( * ) Notice: Subject to any disclaimer, the term of this patent is extended or adjusted under 35 U.S.C. 154(b) by 153 days.

(21) Appl. No.: 17/981,065

(22) Filed: Nov. 4, 2022

(65) Prior Publication Data
US 2023/0053934 A1 Feb. 23, 2023

Related U.S. Application Data

(63) Continuation-in-part of application No. 17/326,687, filed on May 21, 2021, now Pat. No. 11,515,833.

(51) Int. Cl.
*H02S 20/23* (2014.01)
*H02S 40/32* (2014.01)

(52) U.S. Cl.
CPC .............. *H02S 20/23* (2014.12); *H02S 40/32* (2014.12)

(58) Field of Classification Search
CPC ......... H02S 20/00–32; H02S 30/00–20; E04H 6/02; E04H 6/025; E04H 6/04
USPC .................................................. 136/243–265
See application file for complete search history.

(56) References Cited

U.S. PATENT DOCUMENTS

| 6,279,289 B1 | 8/2001 | Soder et al. |
| 9,281,777 B1 | 3/2016 | Borgstrom |
| 11,515,833 B1 | 11/2022 | Ginsberg-Klemmt et al. |
| 2017/0284117 A1 | 10/2017 | Volin |

FOREIGN PATENT DOCUMENTS

| AT | 514642 A1 * | 2/2015 | ............. E04H 6/025 |
| WO | WO-2017030516 A1 * | 2/2017 | |

OTHER PUBLICATIONS

AT-514642-A1 English (Year: 2015).*
Ginsberg-Klemmt, Erika, "GismoPower's MEGA for the "Go!" Final of the American Made Solar Prize Cohort 5 Hardware Track", Aug. 25, 2022, retrieved from internet Sep. 1, 2023, URL: http://www.youtube.com/watch?v=CTMabArvMfk, entire document especially video.

* cited by examiner

*Primary Examiner* — Bach T Dinh
(74) *Attorney, Agent, or Firm* — Donald R. Boys; Central Coast Patent Agency LLC

(57) ABSTRACT

A mobile, electricity generating carport appliance with removable caster wheels and optional ground anchors has a framework with corner posts and a rectangular top, a base plate lying flat on a support surface with the corner posts joined securely to the baseplate, solar panels mounted to the top of the framework, a plurality of solar panels hinged along sides of the framework, one solar panel hinged along a top edge of each end of the framework, support apparatus hinged to posts on each side of the framework, adapted to support the plurality of solar panels hinged on each side of the framework, support apparatus hinged to posts on each end of the framework, adapted to support the one solar panel hinged on each end of the framework, and circuitry and wiring connecting the solar panels to a cable ending in a connector compatible with and connected to an inverter.

18 Claims, 20 Drawing Sheets

ELECTRICITY GENERATING CARPORT APPLIANCE

CROSS-REFERENCE TO RELATED APPLICATIONS

The instant application is a continuation-in-part (CIP) of co-pending application Ser. No. 17/326,687 filed 21 May 2021. All disclosure of the parent application is incorporated at least by reference.

BACKGROUND OF THE INVENTION

1. Field of the Invention

The present invention is in the technical area of solar power generation and pertains more particularly to a system configured as a portable carport.

2. Description of Related Art

Solar systems are notoriously well known in the art and comprise generally a plurality of solar panels that convert sunlight to electrical energy, the solar panels mounted to a fixed structure and connected an electrical apparatus termed an inverter that converts the DC voltage produced by the solar panels to a common voltage useful in a public or private electrical AC grid. In the United States a common voltage for conversion may be 240 volts AC, which is the finally stepped down voltage provided to most homes and businesses from the public grid.

A quite common circumstance involves solar panels mounted on fixed carrier apparatus on the roof of a home or business. This is a common pattern when dealing with a single home or business. In other circumstances solar panels may be mounted and connected in what might be termed a solar farm, where a large area of solar panels may be located on the ground in a rural area, for example, and the electrical output may be provided directly into a public grid, or to a private grid supplying a number of homes or businesses.

It is most common in the art that mounted solar panels are more or less permanently mounted, and not readily moved, such as known for solar panels in a roof installation. Therefore, such panels and the apparatus to which they mount are subject to radical weather events. Exposed panels may be severely damaged, for example, by hurricanes, hailstorms, wind driven debris, tornadoes, falling trees and branches in windstorms, and by a variety of other damaging circumstances.

Given the above discussion the inventors believe that what is clearly needed are movable or portable structures to which solar panels are mounted in a way that the structures, hence the expensive panels as well, may be quickly and efficiently brought into a protective structure, like, for example a garage.

BRIEF SUMMARY OF THE INVENTION

In one embodiment of the present invention an electricity generating carport appliance is provided, comprising a rectangular framework having a length L, a width W, and a height H, comprising four corner posts of d"×d" square metal tubing with cross beams at the upper ends of the posts forming a rectangular top, a rectangular base plate of width W, length L and thickness T equal or less than 1" lying flat on a support surface with the corner posts of the rectangular framework joined securely to the baseplate at corners of the baseplate, a plurality of solar panels mounted to the top of the rectangular framework in a horizontal aspect in a pattern covering all area of the top of the framework, a plurality of solar panels hinged along a long edge of each solar panel to a top edge of a first side of the framework, and a plurality of solar panels hinged along a long edge of each solar panel to a top edge of a second side of the framework, one solar panel of a length equal to width W of the rectangular framework, hinged along the length of the solar panel to a top edge of a first end of the framework, and one solar panel of a length equal to width W of the rectangular framework, hinged along the length of the solar panel to a top edge of a second end of the framework, support apparatus hinged to posts on each side of the framework, adapted in a raised position to support the plurality of solar panels hinged on each side of the framework with the solar panels rotated upward to a horizontal aspect, support apparatus hinged to posts on each end of the framework, adapted in a raised position to support the one solar panel hinged on each end of the framework with the solar panels rotated upward to a horizontal aspect, and circuitry and wiring connecting the solar panels to a cable ending in a connector compatible with and connected to an inverter.

In one embodiment the rectangular base plate has corner regions of d'×d" matching the bottom of each post, with lengthwise and widthwise spans of a span width equal to or less than d" forming edges of the baseplate. Also, in one embodiment there is a minimum clearance of six feet to the rectangular top, the ends have a minimum width of six feet between posts and the sides have a minimum length between posts equal to or greater than six feet, such that vehicles may be driven over spans of the baseplate and through the length or the width of the carport or may be parked under the carport. In one embodiment the appliance further comprises four removable wheel assemblies joined one to each corner post at a lowermost portion of each post such that installing all four wheel assemblies raises the carport appliance a distance D, and enables the carport to be rolled on the wheels of the wheel assemblies. And in one embodiment the appliance further comprises an anchor plate fastened from span to span across each corner of the baseplate inside the post at each corner with a pattern of holes accommodating anchor bolts.

In one embodiment the appliance further comprises anchors compatible with the anchor bolts, the anchors installed in the support surface in a pattern matching the pattern of the holes in all four anchor plates installed on the framework, enabling the carport appliance to be rolled over the pattern of anchors in the support surface, the wheel assemblies to be removed setting the carport down on the support surface, and the anchor bolts to be inserted through the holes in the anchor plates and engaged to the anchors, firmly anchoring the carport appliance to the support surface. In one embodiment d=4 inches. Also, in one embodiment there are a minimum of two solar panels in the plurality of solar panels mounted to the top of the rectangular framework, two solar panels in the plurality of solar panels hinged along a long edge of each solar panel to a top edge of each side of the framework, and one solar panel hinged on each end of the framework, totaling nine solar panels connected in the carport appliance. In one embodiment the cross beams at the upper ends of the posts forming a rectangular top to the framework comprise 4"×4" L-shaped cross beams along each side at the top and 2"×2" cross beams across each end at the top. And in one embodiment the appliance further comprises 4"×4" angled braces from the cross beams along each side to the posts at each corner.

In one embodiment the support apparatus hinged to posts on each side of the framework adapted in a raised position to support the plurality of solar panels hinged on each side of the framework with the solar panels rotated upward to a horizontal aspect, each comprise two arms, each arm hinged to posts at each end of a side at a point below the top and above the base plate, and a lateral bar joined to ends of the arms away from the posts. Also, in one embodiment the arms are of 4"×4" square tubing, each hinged to the post, and the bracket has two locking pins that engages two holes in the arm when the arm is raised, positioning the lateral bar to support the hinged solar panels on the side in a horizontal plane, coplanar with the solar panels on the top. In one embodiment the support apparatus hinged to posts on each end of the framework adapted in a raised position to support the single solar panel hinged on each end of the framework with the solar panels rotated upward to a horizontal aspect, each comprise two arms, each arm hinged to posts at each side of an end at a point below the top and above the base plate, and a lateral bar joined to ends of the arms away from the posts, the lateral bar adapted to engage the solar panel in the raised aspect.

In one embodiment the solar panels are bifacial panels in which both sides of the panels are active. In one embodiment each wheel assembly comprises a first and a second L-bracket each the width of a post mounted securely to opposite sides of the post at different heights, a third L-bracket wider than the post having holes at a angle though the third L-bracket in portions outside the width of the post, and a fourth L-bracket wider than the post engaged beneath the second L-bracket and having holes in regions outside the posts matching the holes in the third L-bracket, at the angle of the holes in the third L-bracket, the fourth L-bracket having a universal caster with a wheel mounted facing down, with threaded rods and nuts coupling the third and fourth L-brackets through the angled holes, such that tightening the nuts on the threaded rods draws the fourth L-bracket down against the second L-bracket, lowering the caster wheel against the support surface and raising the carport on the wheel. In one embodiment the inverter is a combination inverter/charger having cables and connectors for charging electric vehicles. And in one embodiment the inverter is connected electrically to house or business wiring, and with the framework deployed and the solar panels exposed to sunlight the system provides electric power to the home or business, to a connected public or private grid, or to charge electric vehicle batteries.

DETAILED DESCRIPTION OF THE INVENTION

Figure 1:
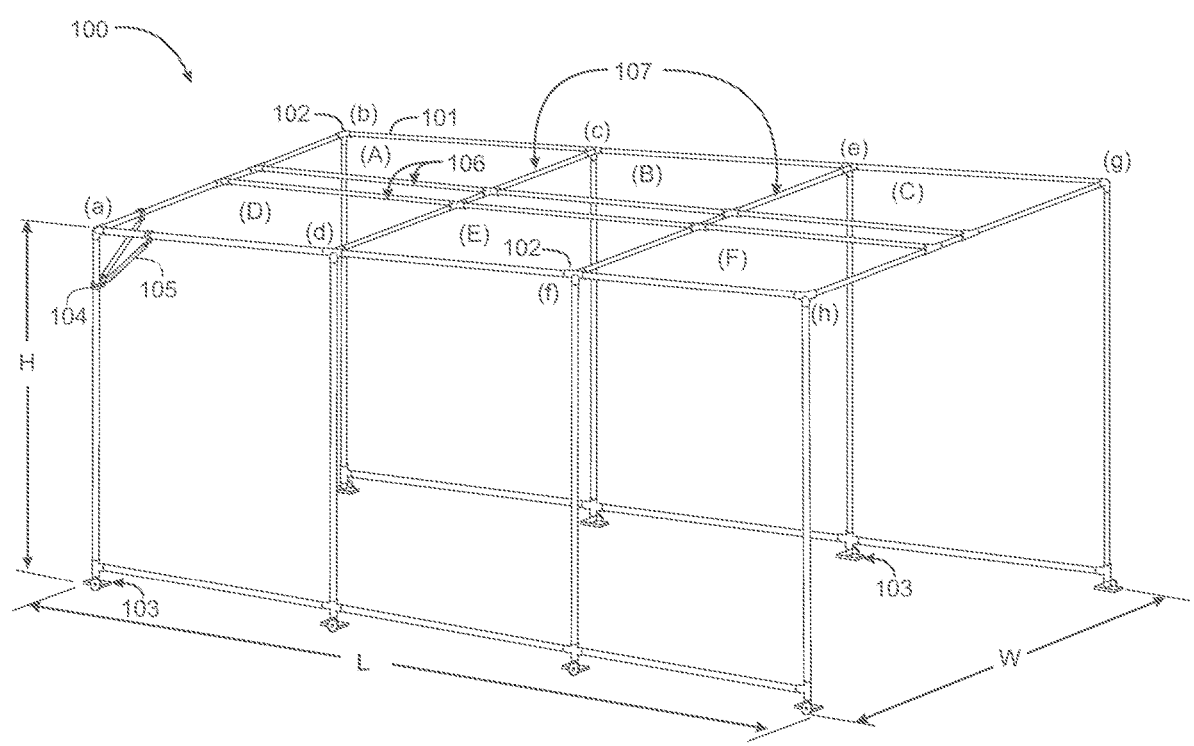
FIG. 1 is a perspective view of a movable framework in an embodiment of the present invention.

FIG. 1 is a perspective view of a movable framework 100 in an embodiment of the present invention. Framework 100 in this example is constructed of aluminum tubing sections such as section 101 which are joined by cast aluminum fittings such as fitting 102, which is a corner fitting. Many such fittings are commercially available. In the present example the tubing is standard 2.0 inch OD aluminum tubing, and once joined with a fitting tubing sections are TIG welded to the fittings.

Each upright (vertical) element in framework 100 ends at the lowermost extremity with a wheel assembly such as assembly 103. In this example there are eight such wheel assemblies. In some embodiments there may be more or fewer than eight, and the wheel assemblies may have a locking brake. In alternative embodiments the wheels may be extendable and retractable, such that the framework may be caused to rest directly on a supporting surface with the wheels raised.

One corner (a) of the framework is shown to be reinforced by braces 105 between clamps 104 fastened to the aluminum tubing. Although not explicitly shown in the figure, corners (b) through (g) may be similarly braced, and typically will be so braced. This triangulation adds needed strength and rigidity to the framework.

In FIG. 1 it is seen that the framework has a horizontal upper level defined by corners (a), (b), (h) and (g). This upper level is divided in this example by two lengthwise tubing arrangements 106 and by two lateral tubing arrangements 107, into six rectangular regions labeled in this example (A), (B), (C), (D), (E) and (F). These regions are sized by the placement of these tubing arrangements to be of the size of solar panels to be used with the system, as is described in enabling detail below.

Framework 100 has a height H, a width W, and a length L in this example, and these dimensions are important to the purpose of the invention. In one embodiment the framework supports solar panels in a solar panel system that doubles as a carport and utilizes driveway space to expose solar panels to sunlight to generate electrical energy, which may be used both for supplementing electrical power in a household or commercial building associated with the driveway or parking space, and to charge batteries for electrical vehicles that may be under the framework or in a nearby garage. Width W for purposes of the invention needs to be wider than an automobile associated with the system in a use case, but more narrow than a width of a garage doorway associated with the system, length L needs to as long as or longer than the automobile, and height H needs to be higher than the overall height of the automobile but less than the height of the garage door. It will be apparent that these dimensions may vary depending on use case and application, but one set of dimensions may well work for most applications.

Figure 2:
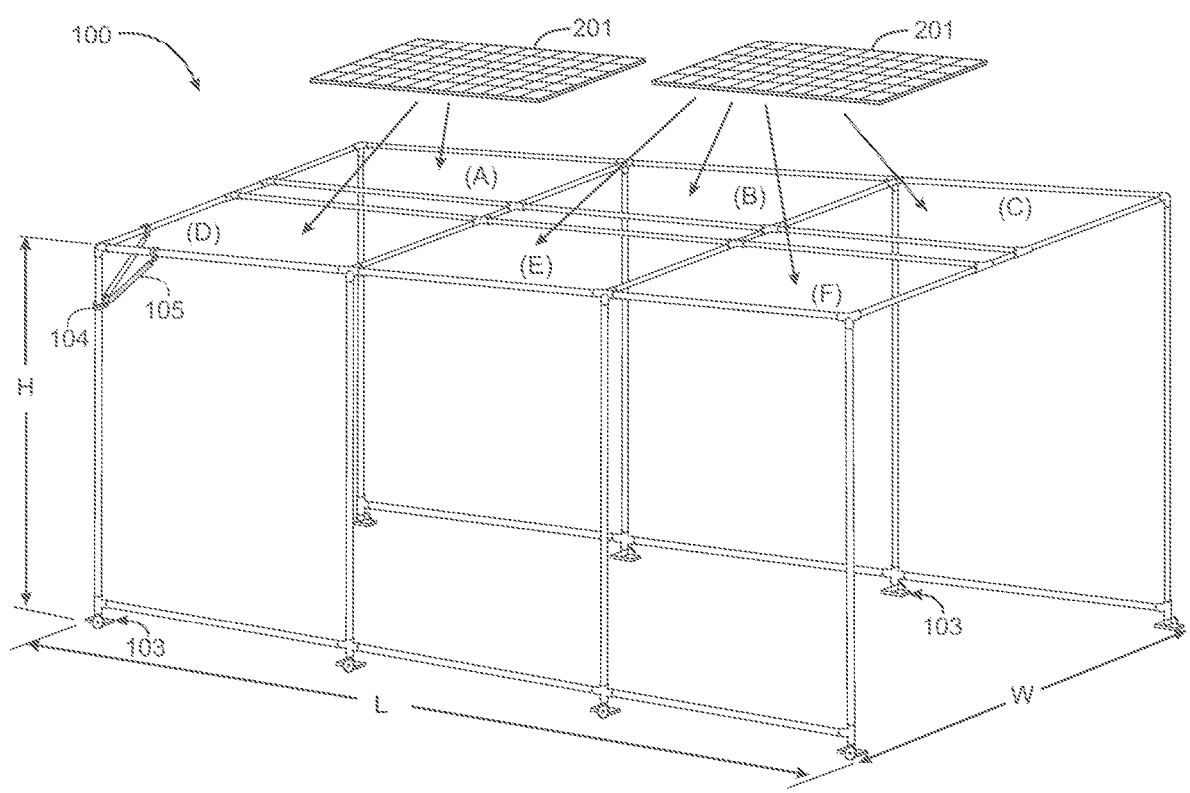
FIG. 2 is a perspective view of the framework of FIG. 1 showing where solar panels are mounted in an embodiment of the invention.

FIG. 2 is a perspective view of framework 100 of FIG. 1 with solar panels 201 shown to be added to regions (A) through (F). In this example the solar panels are GCL-M6/72DH Bifacial panels. Bifacial means that the 12 solar cells that make up one solar panel 201 are made to be active on both sides. When installed in regions (A) through (F) of the framework these six panels will be active especially for sunlight from above but will also be active and will generate electricity by reflected sunlight from surfaces of a vehicle under the framework.

Figure 3:
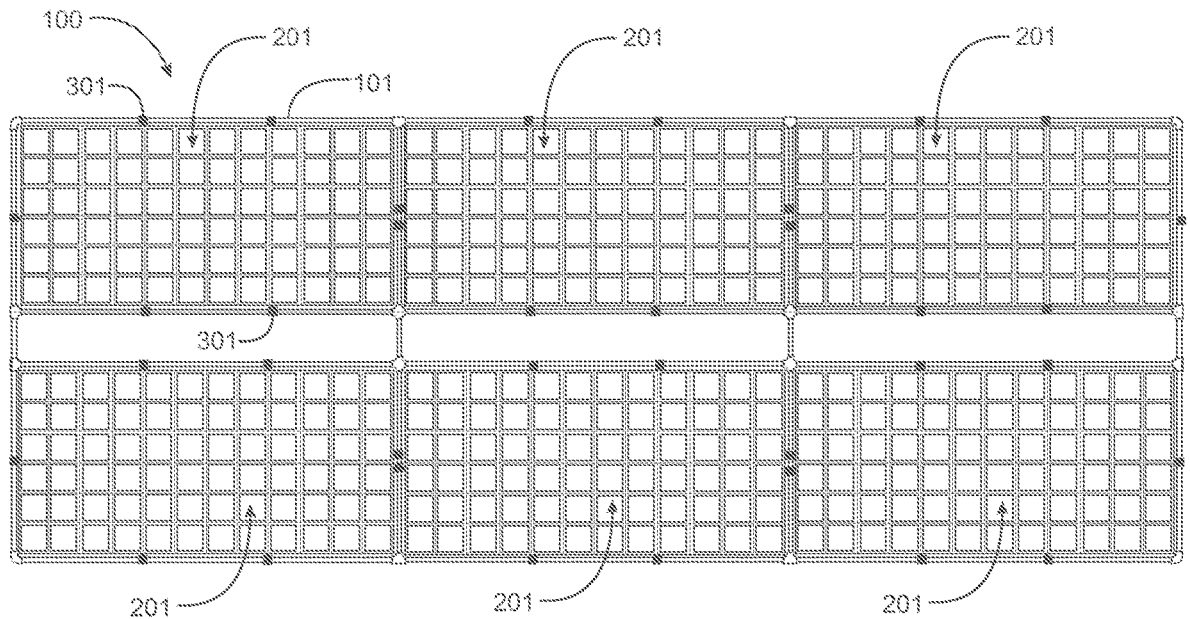
FIG. 3 is a plan view of an upper level of the framework showing six solar panels mounted in an embodiment of the invention.

FIG. 3 is a plan view of the upper level of framework 100 with solar panels 201 installed in each of the six regions (A) through (F) in this example. In this example the solar panels are GCL-M6/72DH Bifacial panels as indicated above, with each panel about 80 inches in length, so the overall length of the structure is a little more than three times this dimension, or about 20 feet in length. The width is about 8 feet. The solar panels are retained within each of regions (A) through (F) by use, in this example, of connectors 301, which in this example are clamps that are attached over the 2 inch tubes of the tubular frame, and connect to holes on the sides of the solar panels. This, it will be understood, is just one of a variety of ways that the solar panels may be secured in the regions of the framework. In the example of FIG. 3 there are 6 solar panels exposed to sunlight, but the structure in embodiments of the invention is not limited to 6 panels.

Figure 4:
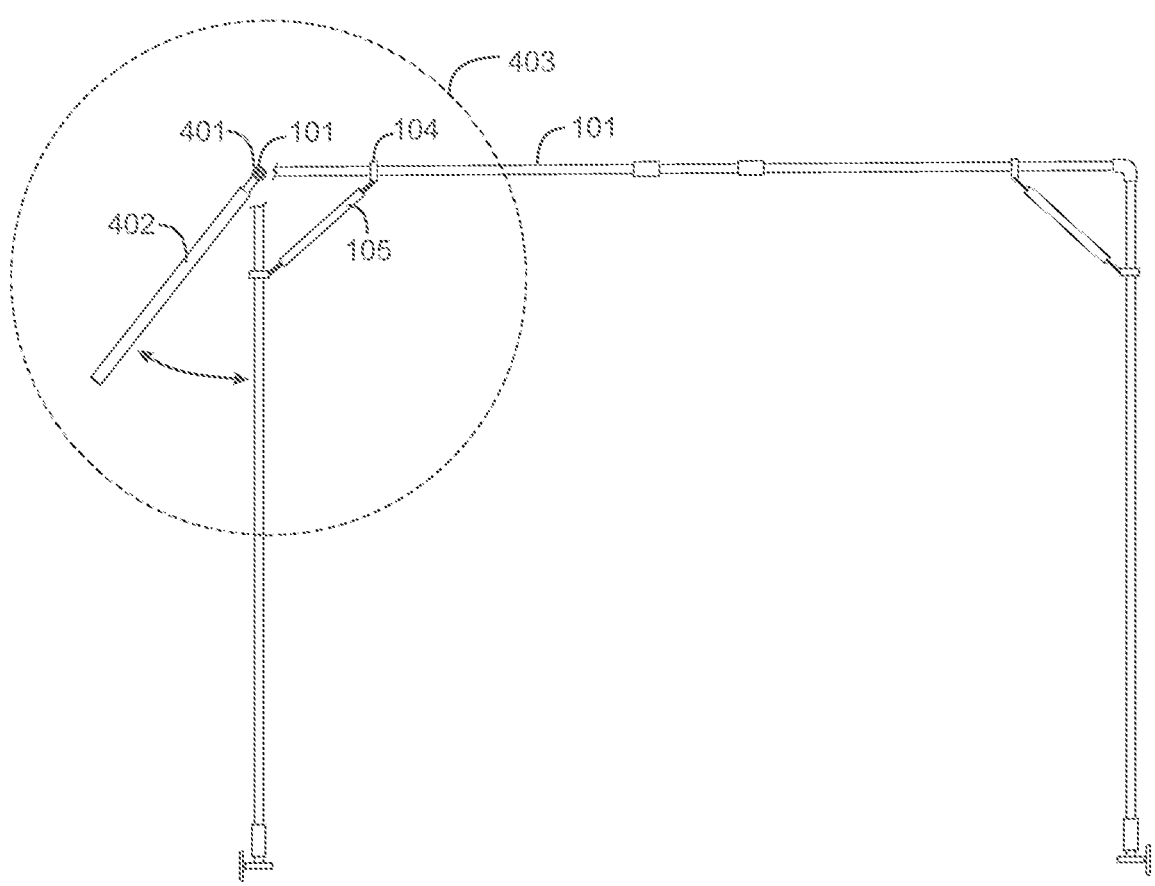
FIG. 4 is an end view of the framework showing how additional solar panels may be added to the framework.

FIG. 4 is an end view of framework 101 showing mounting of additional panels to outside tubes of the framework in a manner that the additional panels may be rotated into a horizontal position for maximum effect and may be rotated to a nearly vertical position to enable the framework to minimize the overall width to enable the structure to be moved, for example, from a driveway to inside a garage. In FIG. 4 a corner cast aluminum fitting is removed in the figure to show a clamp mechanism 401 mounted to a lengthwise upper tubing, with the clamp mechanism attached to a panel frame 402 which may hold a solar panel. The frame 402 is shown at an angle of about 30 degrees from vertical but may be lowered to minimize the overall width of the structure or raised so that a mounted solar panel in frame 402 may be horizontal for maximum sunlight exposure.

Figure 5:
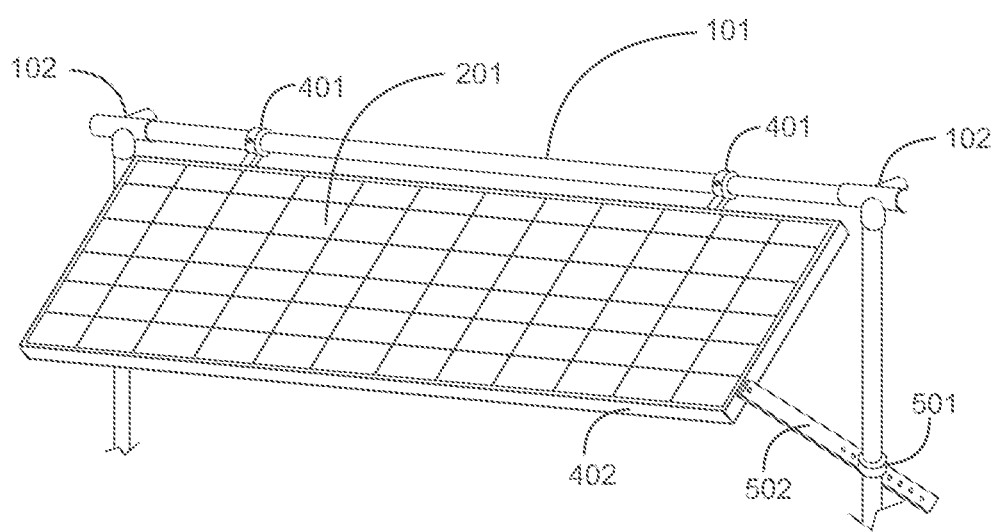
FIG. 5 is a perspective view of a frame mounted to the side tubing to better illustrate the nature of the mounting in this embodiment.

FIG. 5 is a perspective view of frame 402 mounted to the side tubing 101 to better illustrate the nature of the mounting in this embodiment. Frame 402 mounts a solar panel 201 the same as the solar panels mounted in the upper level as shown in FIG. 3. Clamp mechanisms 401 may be loosened to rotate frame 402 and tightened to secure the frame, and therefore the solar panel, at a new attitude, including a horizontal attitude parallel with the solar panels mounted in the upper level. In an alternative embodiment there may be props 502 connecting to anchors 501 by which the side panels may be raised or lowered. It will be apparent that there are a variety of ways that side frames 402 carrying solar panels may be raised or lowered.

As many as six frames 402 with solar panels 201 may be provided along the sides of the framework, three along each side, which effectively doubles the number of solar panels in the apparatus, to twelve.

Figure 6:
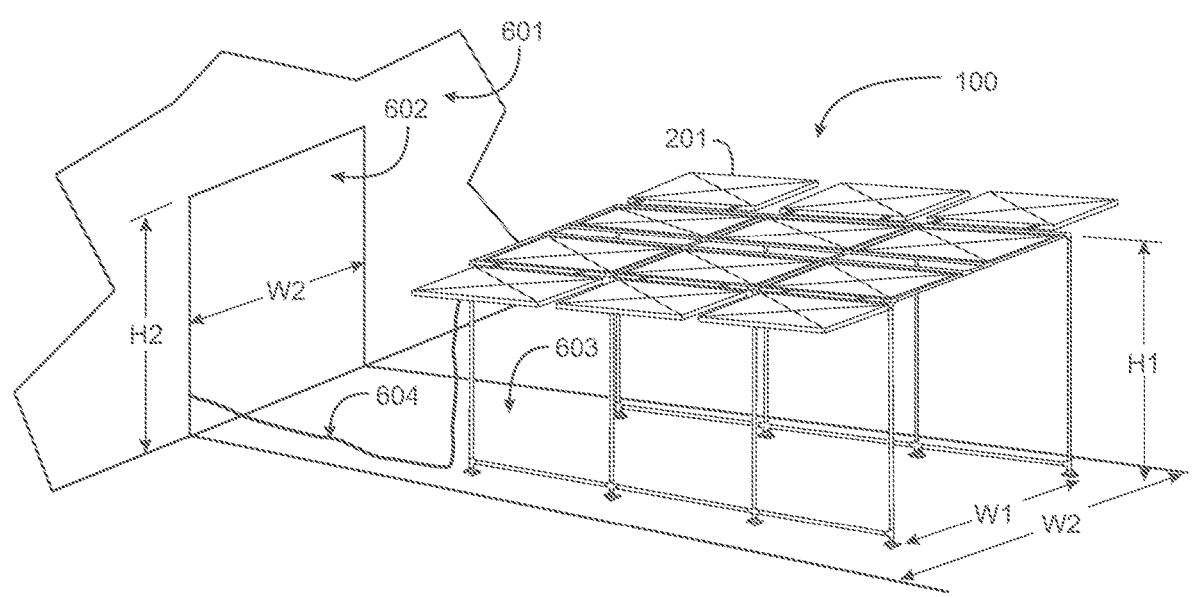
FIG. 6 illustrates the movable framework with mounted solar panels positioned in a driveway leading to a garage door.

FIG. 6 illustrates movable framework 100 with a full complement of mounted solar panels 201 positioned in a driveway or parking space 603 leading to a garage door 602 in a side of a home or business 601. It may be seen that the extra side panels to each side of the framework are deployed level with the solar panels in the top of the framework such that all twelve solar panels are parallel and horizontal. Width of the driveway is W2 which is greater than the width W1 of framework 100. The width of the garage door opening is also W2, the same as the width of the driveway in this example. The height of the framework H1 is less than the height w2 of the garage door. The deployment of the side panels provides maximum energy generation, which is routed to an inverter in the garage by a cable 604, but this makes the overall width greater than the width W2 of the garage door. In this configuration the moveable framework cannot be rolled into the garage.

Figure 7:
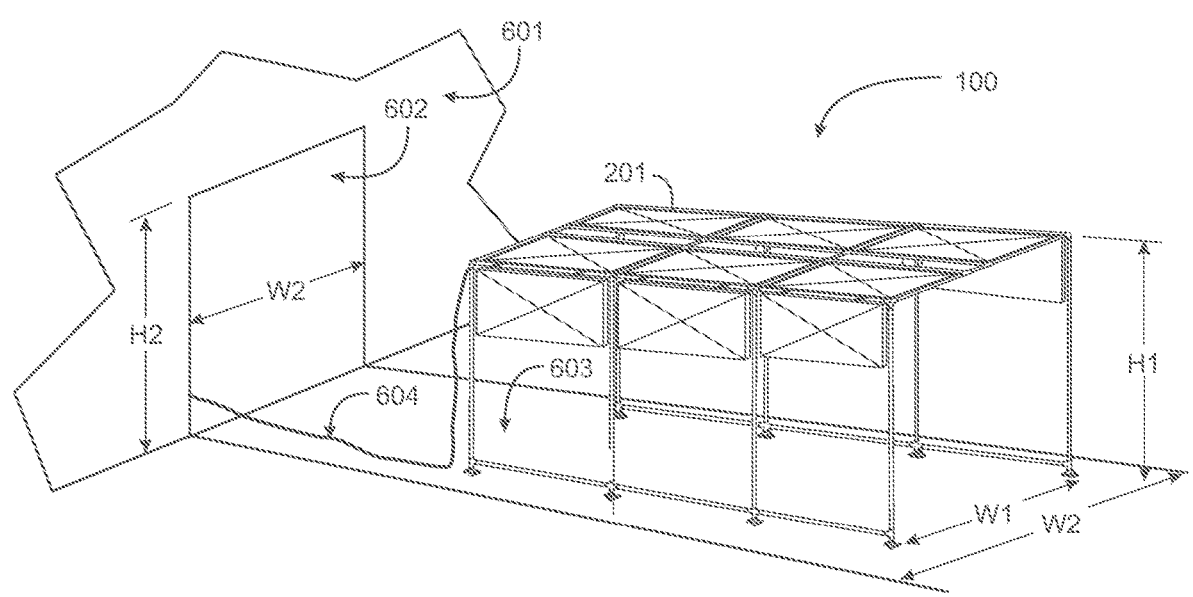
FIG. 7 is a perspective view of the framework in the driveway with outside panels lowered.
Figure 8:
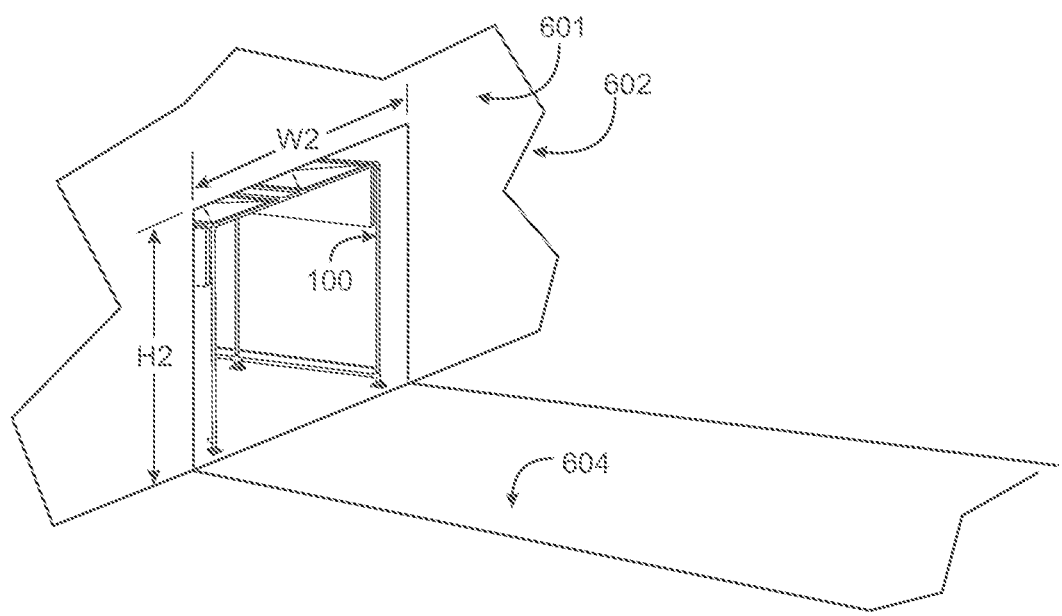
FIG. 8 is a perspective view of the driveway with the framework rolled into the garage.

FIG. 7 illustrates the circumstance of FIG. 6 except the side panels have been retracted to a vertical position, reducing the overall width of the framework with panels to W1. In this configuration the framework with panels may be rolled into the garage through the garage door. FIG. 8 illustrates the framework 100 with solar panels moved into the garage through the garage door.

In the examples shown and described, with a framework with solar panels stored in the garage, an automobile, a truck or motorcycles may still be parked in the garage beneath the framework, as the inside height and width of the framework is high and wide enough to clear most automobiles. A user may open the garage door and manually roll the framework on wheel assemblies 103 out of the garage through the garage door, trailing cable 604 until the framework is fully deployed in the driveway. The side panels may then be deployed level, and the system will generate electricity. At a time when a weather event, or for some other reason it is determined to store the framework in the garage the side panels may be lowered, the garage door opened, and the framework may be rolled back into the garage with enough space to also park the car underneath.

Figure 9:
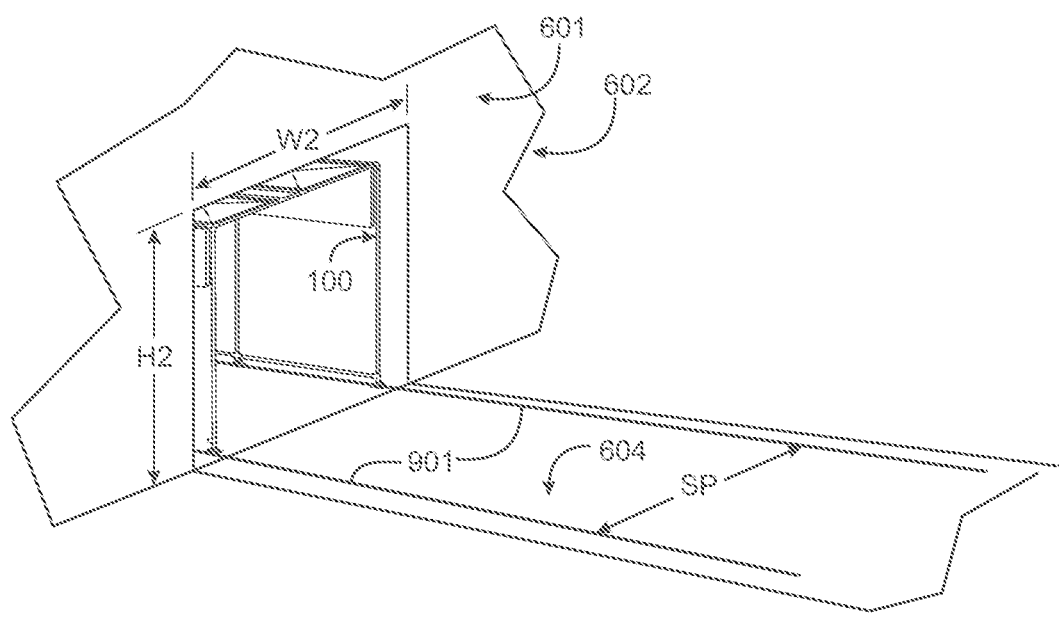
FIG. 9 is a perspective view of a driveway with tracks to guide the framework as the framework is moved.

Cable 604 in one embodiment ends in a standard 240 volt connector, which may be plugged into an inverter to connect into the house or business wiring, and the solar panel system will supplement electrical usage in the home or business as an electricity generating appliance. In one embodiment the inverter is a Solar Edge™ HD Wave inverter which accepts a 240V connector and also provides connectors for charging electric vehicles. The inverter in one embodiment is mounted just inside the garage door but may be positioned elsewhere as well. The entire system functions as an electricity generating, portable appliance in one unit. FIG. 9 illustrates an embodiment of the system wherein optional tracks 901 are provided on the driveway at a spacing SP to match the distance between wheels 103 on the movable framework. The optional tracks may be either cut into the driveway or strips of material may be laid onto and adhered to the surface of the driveway to form the tracks. The optional tracks guide the framework both going into and coming from the garage.

Figure 10:
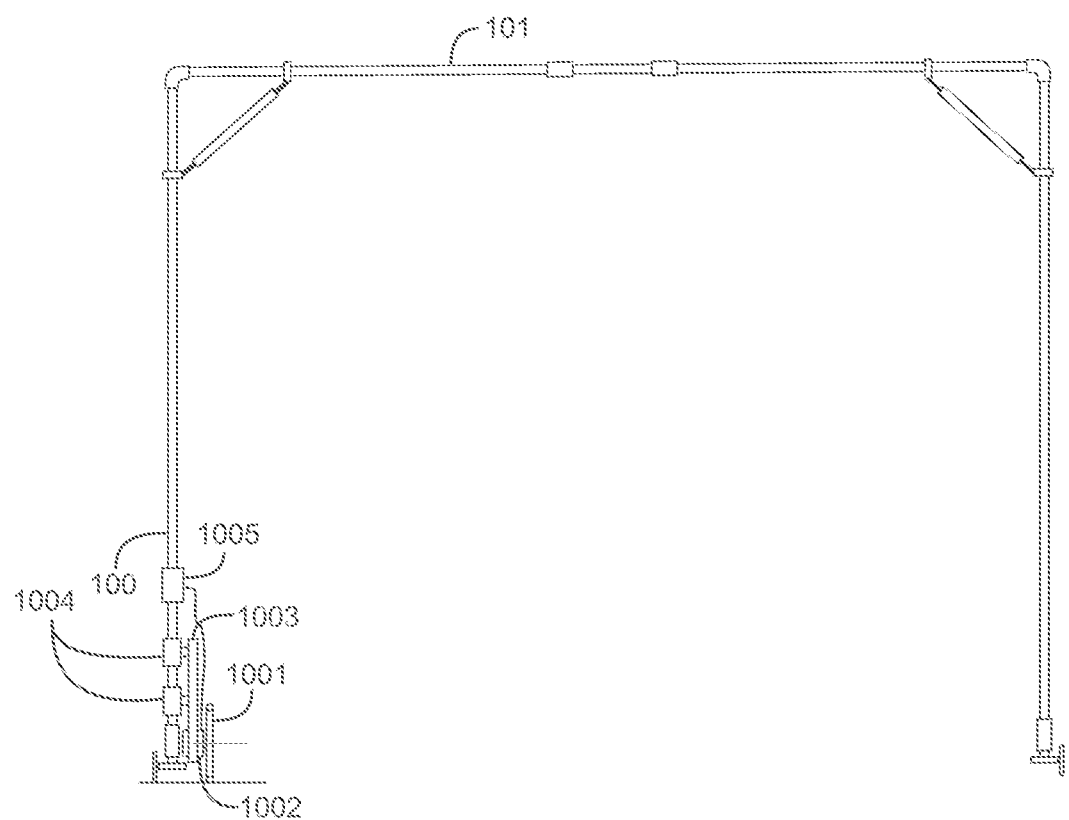
FIG. 10 is an end view of the framework in an embodiment employing a drive motor and wheel.

FIG. 10 illustrates an alternative embodiment wherein a single wheel 1001 driven by a DC motor 1002 mounted in a frame 1003 fastened to an upright of the framework by clamps 1004 is provided on one side at a lower level of the framework at the end of the framework that first enters and last leaves the garage. The motor may be driven in either direction and turned on and off to propel the framework from the garage and to bring it back into the garage. On-off and direction inputs may be provided on a small junction box 1005 fastened to an upright of the framework near the motor and wheel. In an alternative embodiment there may be circuitry in junction box 1003 with Bluetooth or other wireless communication capability, and an application may be provided on a smart phone with an interactive interface to operate the drive wheel to propel the framework into or out of the garage. This apparatus works best in an embodiment wherein tracks, as in FIG. 9, are provided to constrain the wheels 103 of the framework.

In one embodiment cable 604 that connects the solar panels of the apparatus of the invention to an inverter may be wound on a reel in the garage with spring coiling, such that the cable plays out as the framework is moved from the garage to a position in the driveway, and winds back on the reel as the framework re-enters the garage.

Figure 11A:
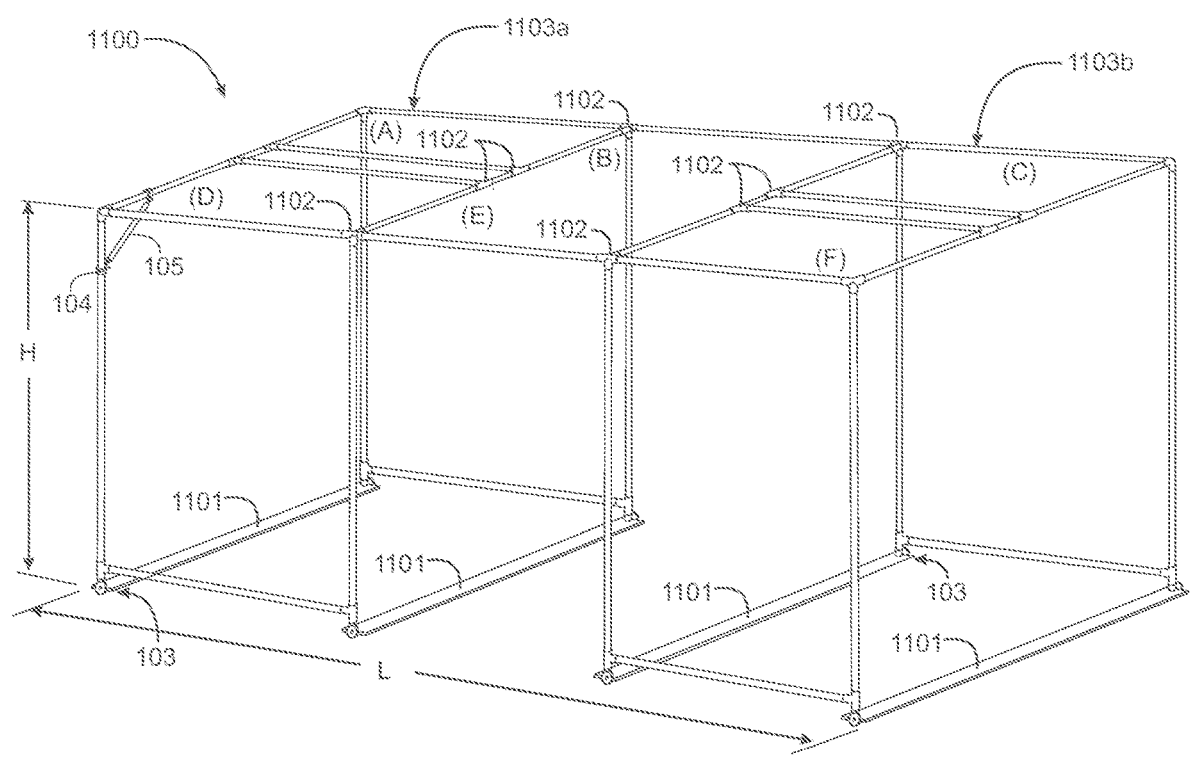
FIG. 11A is a perspective view of a solar carport structure in another embodiment of the invention.

FIG. 11A is a perspective view of a structure for a portable solar carport in another embodiment of the invention. In this embodiment two rectangular structures 1103a and 1103b that are mirror images are joined by tubes only at the upper level, the tubes engaged in fittings 1102 that are fittings that enable the tubes to be engaged and disengaged. The structures are joined side-to-side additionally by flat bars 1101.

In this embodiment wheel assemblies 103 are of a commercially available sort well-known in the art that may be deployed and retracted such that the structure may be slightly raised on caster wheels that allow universal horizontal movement and lowered to cause the structures to rest on the flat bars 1101.

With the structures 1103a and 1103b joined as shown in FIG. 11A solar panels may be mounted exactly as described above with reference to FIG. 2 and also referenced in other descriptions, and the joined structure may reside on a driveway providing electricity generation just as described herein in other embodiments.

Figure 11B:
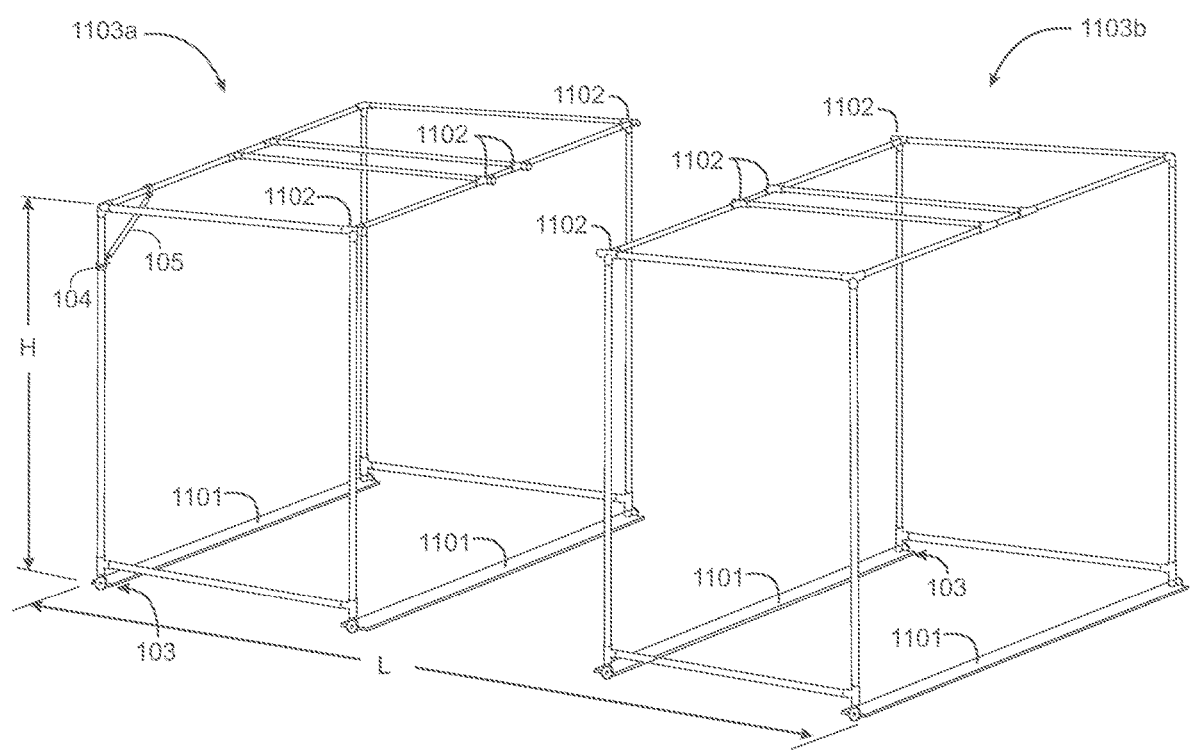
FIG. 11B is a perspective view of the structure of FIG. 11A with tubings removed to produce two separate portable units.

When a user has determined to store the portable solar carport in a garage or other storage area the user may disconnect the tubes joining structures 1103a and 1103b by releasing the tubes joined by fittings 1102 and removing the tubes. FIG. 11B illustrates the result, with structures 1103a and 1103b now separate structures, separately movable. The user may now deploy the caster wheel mentioned above to raise the structures separately on the caster wheels, and each structure may be separately rotated and moved into the garage separately. This innovation provides a means of moving and deploying the overall structure of the portable solar carport that is easier for the user to manually manipulate.

In one embodiment of the invention individual ones of the solar panels may be connected directly to a micro-inverter, converting the direct current (DC) produced to an alternating current (AC).

Having illustrated and described a number of examples of the invention it is again emphasized here that the framework is open both in the front and the rear with sufficient height and width that a user may park an automobile or other vehicle under the framework with the framework positioned in the driveway to present solar panels to sunlight. Moreover, the user may drive a vehicle under and through the framework and into the garage. The system of the invention presents no real impediment to the use of the garage or the driveway.

MEGA Version

In alternative embodiments of the invention a more robust and serviceable version of the solar carport appliance is provided with additional functionality over the embodiments described above. MEGA stands for Mobile Electricity Generating Appliance.

Figure 12:
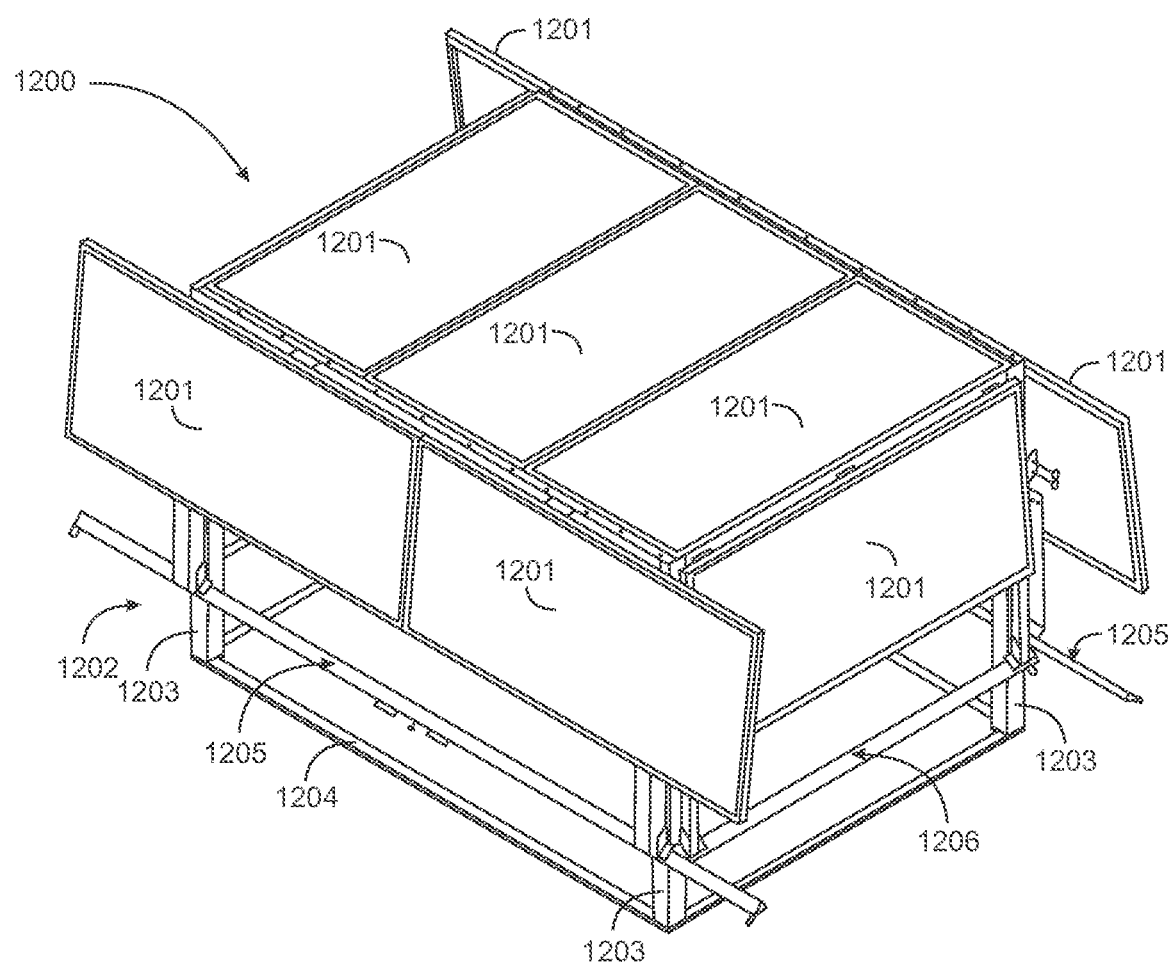
FIG. 12 is a perspective view of a MEGA carport in one embodiment of the invention.

FIG. 12 is a perspective view of a MEGA carport 1200 in one embodiment of the invention. Carport 1200 comprises nine (9) bifacial solar panels 1201 one of which is not seen in FIG. 12, being implemented on a far end of the carport not visible in the view of FIG. 12. In FIG. 12 panels 1201 are carried on a sturdy framework 1202 having four corner posts 1203 (three corner posts are visible in FIG. 12) that are made from 4"×4" aluminum square tubing stock. In one embodiment the wall thickness of the square tubing stock is ⅛ inch, but in some instances, for a more sturdy version, tubing with a wall thickness of 3/16 inch or even ¼ inch may be used. Two solar panels 1201 on each long side and one solar panel on each width end are hinged at an upper edge and folded down in a position suitable for moving the portable solar panel. Lengthwise and widthwise cross braces are implemented in framework 1202 but not seen under the folded down solar panels on the sides and ends of the carport.

A rectangular flat base 1204 with four sides each in one embodiment one-half the width of a post 1203 (2") lies flat on a support surface, such as a driveway, which support surface may be concrete or asphalt, and posts 1203 of framework 1202 are joined to this base at the four corners, such as by steel bolts.

Two lengthwise support structures 1205 are hinged to corner posts 1203 on each long side in a manner that the support structures may be deployed to support the two solar panels on each side of the carport when those panels are raised on their hinged edges to a horizontal plane with the solar panels on the top of the carport. Similarly, there are two support structures 1206, one on each end of the carport, hinged to the corner posts of the framework on each end, which may be deployed to support the single solar panels on each end of the carport when those panels are raised on their hinged edges to a horizontal plane with the solar panels on the top of the carport. When the four side and two end solar panels are raised and supported horizontally there are nine (9) solar panels in a horizontal plane displayed to catch maximum rays.

Figure 13:
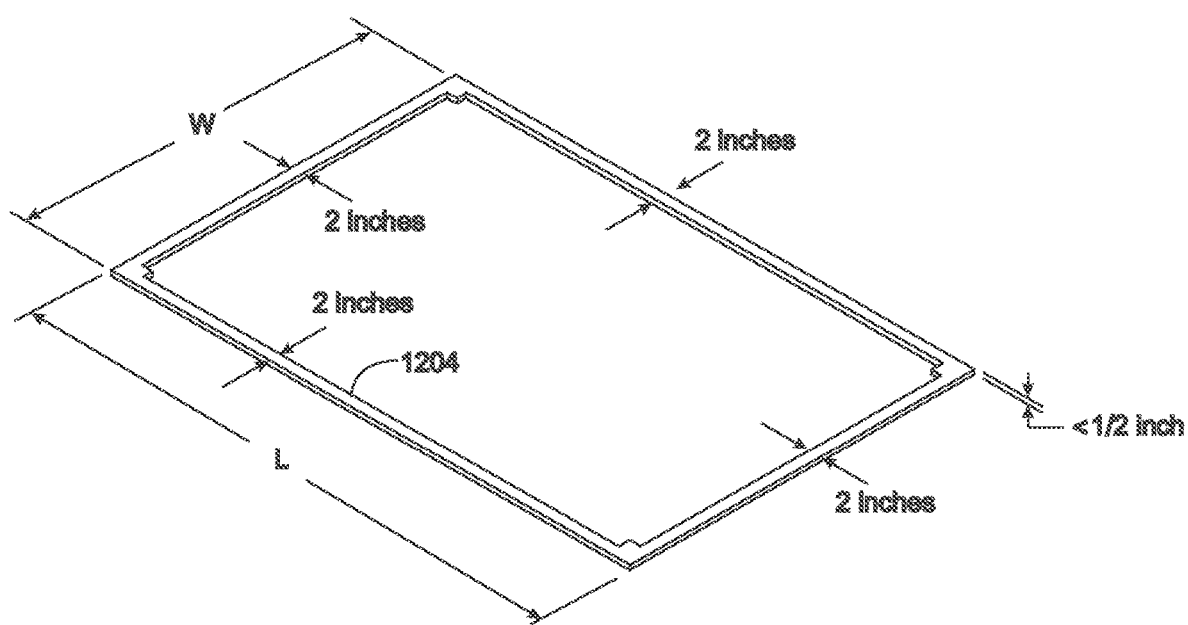
FIG. 13 illustrates a rectangular flat base of the carport of FIG. 12 in an embodiment of the invention.

FIG. 13 illustrates rectangular flat base 1204 in the same aspect as in FIG. 12. Base 1204 lies flat on the supporting surface, which may be a driveway surface, such that, with the framework 1202 engaged and the solar panels raised, a car, truck or other vehicle may be driven over the base under the carport through either the ends or the sides of the carport. Base 1204 has a length L and a width W which are also the width and length of the framework in a carport on the base. In one embodiment W is about 8 feet and length L is about 20 feet, but both of these dimensions may be different in other embodiments. A 4" by 4" region is implemented on each corner of base 1204 to mate with the 4"×4" bottom of the corner posts 1203. In an alternative embodiment the width of each span of the base may be 4" rather than two inches.

Base 1204, having a limited height, such as equal to or less than one-half inch, provides considerable structural support for the framework and presents very little impediment to a vehicle driven over a span of the base. The length and width of base 1204 may vary in different embodiments, but with framework posts 1203 at 4 inches square, the width of each span of base 1204 will be 4 inches.

Figure 14:
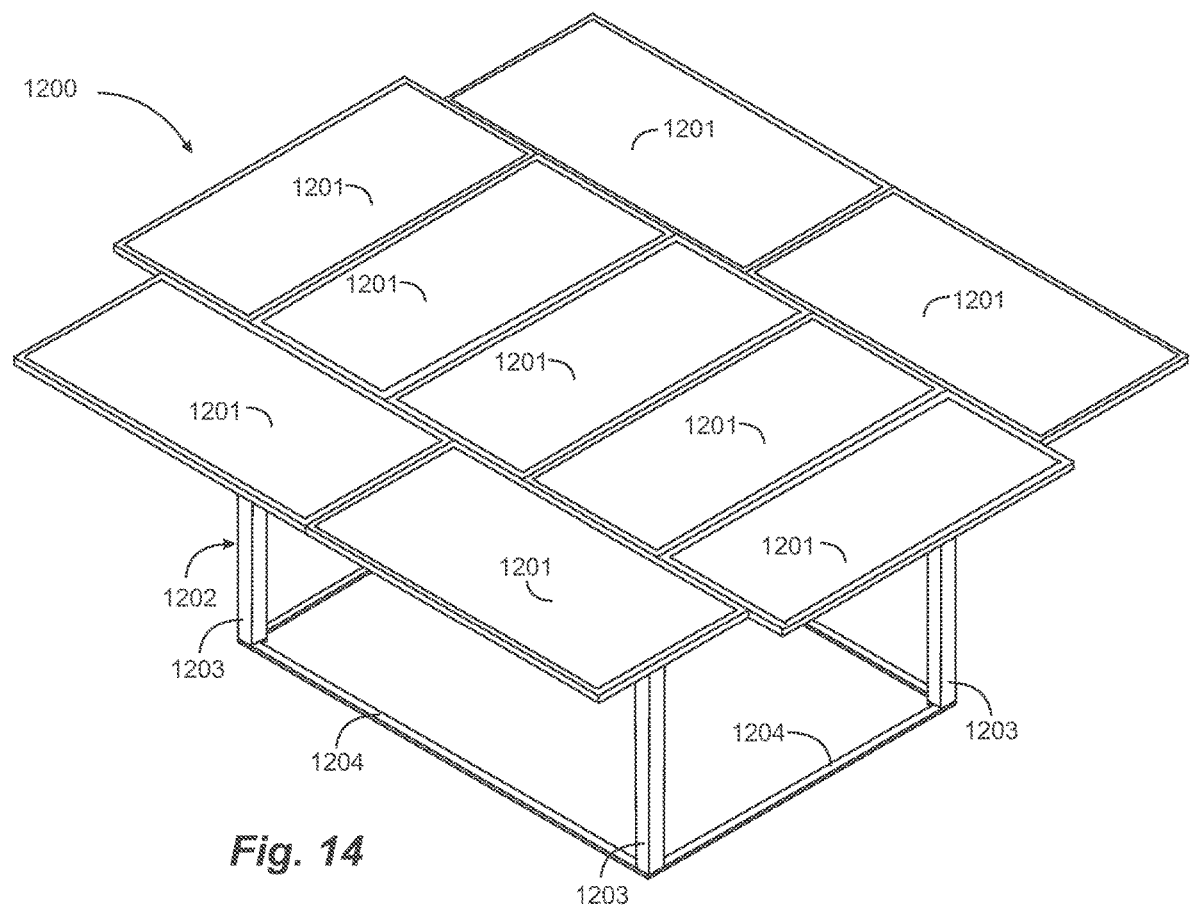
FIG. 14 is a perspective view of the carport of FIG. 12 with solar panels raised in an embodiment of the invention.

FIG. 14 illustrates the carport 1200 with the six hinged solar panels raised to the horizontal plane of the three solar panels that are arrayed across the top of the framework and are not hinged. The apparatus 1205 and 1206 that are hinged on the corner posts are not seen in FIG. 14 under the solar panels. FIG. 14 shows the carport in an arrangement for operation, with all of the solar panels in horizontal aspect and coplanar.

Figure 15:
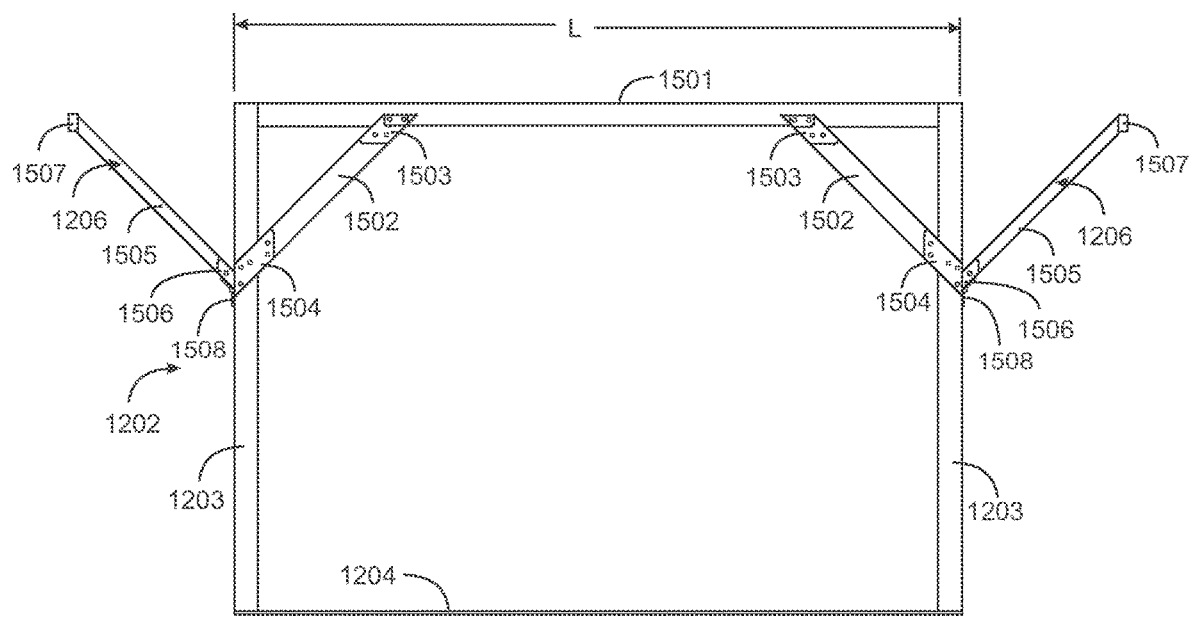
FIG. 15 is a side elevation view of a framework of the carport of FIG. 12 in an embodiment of the invention.

FIG. 15 is a side elevation view of framework 1202 with apparatus 1206 on hinges 1508 on each end raised in position to support the single hinged solar panels on each end of the carport in a horizontal aspect. Apparatus 1206 in FIG. 12 is shown as folded down against posts 1203, which allows the solar panels on the ends to fold down to a vertical aspect. Each apparatus 1206 comprises an arm 1505 made from square aluminum tubing, hinged in a bracket 1506 that is fastened to post 1203. A rail 1507 fastened in a horizontal aspect at ends of arms 1505 supports the end solar panels in the raised aspect.

A 4-inch L-shaped beam 1501 in this example spans between posts 1203. Beam 1501 is supported on each end to posts 1203 by a 4-inch square brace 1502 fastened between brackets 1503 and 1504, which brackets in this example fasten respectively to the beam and to the posts.

Figure 16:
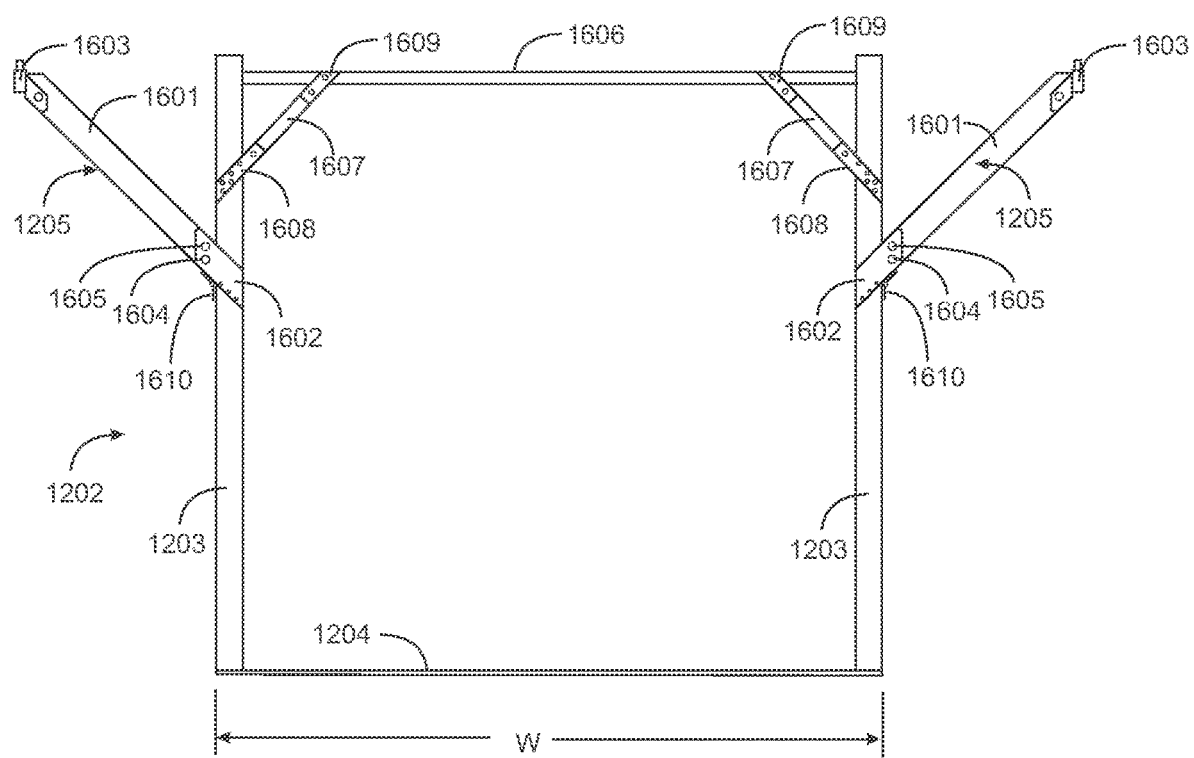
FIG. 16 is an end elevation view of a framework of the carport of FIG. 12 in an embodiment of the invention.

FIG. 16 is an end elevation view of framework 1202 with hinged apparatus 1205 on each side raised in position to support the two hinged solar panels on each side of the carport in a horizontal aspect. Apparatus 1205 in FIG. 12 is shown as folded down against posts 1203, which allows the solar panels on the sides to fold down to a vertical aspect. Each apparatus 1205 comprises an arm 1601 made from 4" square aluminum tubing in this example, hinged in a bracket 1602 that is fastened to post 1203. A rail 1603 fastened in a horizontal aspect at ends of arms 1601 supports the side solar panels in the raised position. Arm 1601 pivots on a hinge 1610, pins 1604 & 1605 are inserted in the raised position to support arm 1601.

Carport 1200 as described in the MEGA version is intended to be deployed on premises, such as on a driveway in front of a garage, on a semi-permanent basis. Earlier versions described above had deployable and retractable wheels such as wheel assemblies 103 described above. It has been determined that it may be better to have removable wheel assemblies, since the carport may need to be moved only occasionally, and the wheel assemblies may be best not exposed to the elements except when needed. Further, it has been determined there needs to be a means of anchoring the carport to the surface upon which it rests, as some driveways are not level, and wind may occasionally be a problem. In some regions tornadoes or hurricanes may be a problem.

Figure 17:
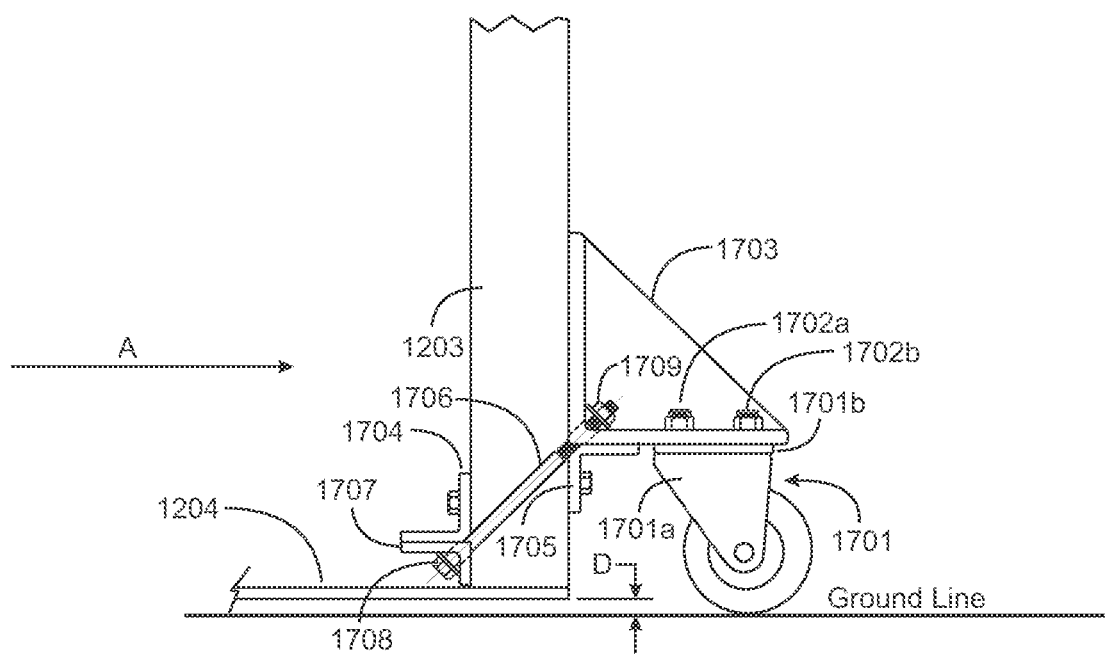
FIG. 17 illustrates a high-load wheel assembly mounted to a post in an embodiment of the invention.

FIG. 17 is an elevation view of one corner post 1203 of the MEGA version carport illustrating a removable, high-load wheel assembly 1701 having a wheel made in this example from a Ultra High Molecular weight (UHMW) polymer. Wheel assembly 1701 has an upper portion 1701*b* that bolts under a bracket 1703 by four nuts and bolts of which 1702*a* and 1702*b* may be seen in the figure, and a lower part 1701*a* that is free to rotate relative to part 1701*b* around a vertical axis. Bracket 1703 is about two inches wider than post 1203 in this example, about six inches, and extends one inch from each side of post 1203. Bracket 1703 is not bolted to post 1203, but rests on an L-bracket 1705 that is the width of the post, four inches, and is bolted to post 1203. A second L-bracket 1704 also of four-inch width is bolted to post 1203 on an opposite side from L-bracket 1705 at a predetermined lower position. A third L-bracket 1707 has a width of six inches, like bracket 1703, and two holes at an angle, passing through the bracket at the corner as shown, in the extended portions outside the post. Bracket 1703 has similar holes in the extended portions outside the post. Some embodiments use angles between 10 and 80 degrees and preferably between 25 and 65 degrees. Two long steel bolts 1706 in this example pass through the angled holes in brackets 1703 and 1707 and are constrained at the top end by a nut and washer 1708 and 1709. Only one bolt and one nut and washer is seen in this view.

A person of skill in the art will understand that with nut 1709 loosened such that bracket 1703 is not urged against bracket 1705, the framework of the carport will rest on the supporting surface at the ground line. As the nuts are tightened, bracket 1703 is drawn against bracket 1705, and the framework is lifted from the ground line to a height "D" which is determined by the relative positions of brackets 1704 and 1705.

Figure 18:
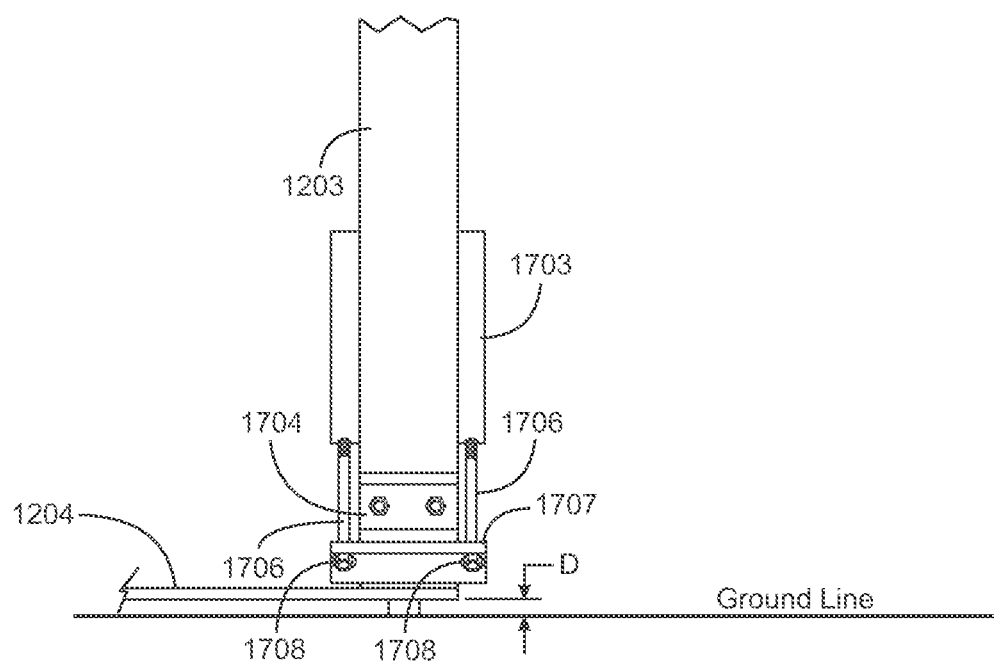
FIG. 18 illustrates the wheel assembly of FIG. 17 from a different viewpoint in an embodiment of the invention.

FIG. 18 is a view of the assembly of FIG. 17 in the direction of arrow A in FIG. 17, to better illustrate the nature of the assembly. Bracket 1704 is seen bolted to post 1203 on the near side of the post, and bracket 1707 is seen with bolt 1706 passing through at an angle. Bracket 1703 may be seen on the far side of post 1203 with threaded rods 1706 passing through bracket 1703 at an angle. The threaded rods are secured to bracket 1703 by nut and washer sets 1709, not seen in FIG. 18 but shown in FIG. 17.

The apparatus illustrated in FIGS. 17 and 18 may be implemented at all four corners of the carport 1200, and once installed and secured the entire carport is raised on wheels and may be moved along the supporting surface either to store in a garage or other storage facility. The carport may be moved as well on the wheels to a different location or onto a conveyance vehicle to be carried away.

The inventor believes the apparatus shown in FIGS. 17 and 18 is capable of supporting the considerable weight of the MEGA version of the carport and facilitating the mobility of the carport. When the carport is moved or repositioned, and is in a position desired by the user, the wheel assemblies may be removed, placing the carport back on the supporting surface.

Once replaced on the supporting surface there may be occasion of expected high winds, even a tornado or a hurricane, that could move or damage the carport. To protect against such an occurrence, if it is neither desirable nor possible to move the framework inside a shelter, an anchoring system is provided to secure the carport by its framework to the supporting surface.

Figure 19:
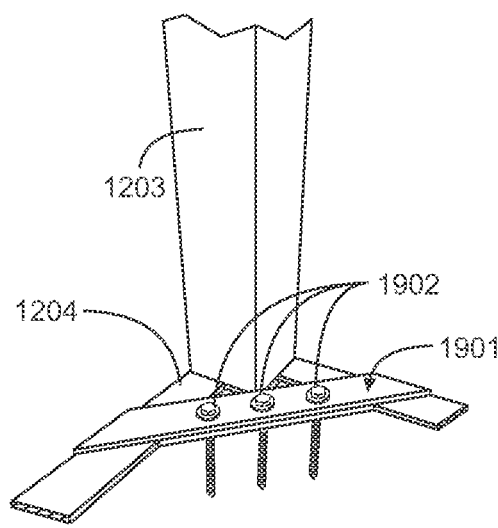
FIG. 19 illustrates an anchor system in an embodiment of the invention.

FIG. 19 illustrates one corner post 1203 of the MEGA version of the carport in one embodiment. A cross brace 1901 is placed at an angle across between spans of base 1204. Some embodiments use angles between 10 and 80 degrees and preferably between 25 and 65 degrees. There are three through holes in the cross brace and anchor bolts 1902 are used to anchor the carport to the supporting surface. One such cross brace with anchor bolts is used preferably at each corner post to very securely anchor the carport to the surface.

In one embodiment, once the carport is deployed on a driveway or other supporting surface, the anchoring cross braces are installed if not already in place. Locations for anchors in the supporting surface are marked through the three holes in each cross brace. The carport is moved aside a short distance, and holes are drilled in the surface and anchors are installed to accept the anchor bolts. Once the anchors are installed the carport may be positioned properly over the anchor points and the anchor bolts engaged to securely anchor the carport to the supporting surface.

A person of ordinary skill will understand that the embodiments described above are each and all exemplary and are not limiting to the scope of the invention, which is limited only by the claims. There are a variety of ways that different features of the invention may be implemented other than the specific ways disclosed in the examples illustrated and described. For example, there are many materials that may be used for the framework other than aluminum tubing. Material suggestions provided herein are exemplary only and not intended to be limiting. Thus disclosed, it will be obvious to a person skilled in the art to select a suitable material. Many sorts of solar panels may be employed. The scope is limited only by the claims.

The invention claimed is:

1. An electricity generating carport appliance, comprising:
   a rectangular framework having a length L, a width W, and a height H, comprising four corner posts of d"×d" square metal tubing with cross beams at the upper ends of the posts forming a rectangular top;
   a rectangular base plate of width W, length L and thickness T equal or less than 1" lying flat on a support surface with the corner posts of the rectangular framework joined securely to the baseplate at corners of the baseplate;
   a plurality of solar panels mounted to the top of the rectangular framework in a horizontal aspect in a pattern covering all area of the top of the framework;
   a plurality of solar panels hinged along a long edge of each solar panel to a top edge of a first side of the framework, and a plurality of solar panels hinged along a long edge of each solar panel to a top edge of a second side of the framework;
   one solar panel of a length equal to width W of the rectangular framework, hinged along the length of the solar panel to a top edge of a first end of the framework, and one solar panel of a length equal to width W of the rectangular framework, hinged along the length of the solar panel to a top edge of a second end of the framework;
   support apparatus hinged to posts on each side of the framework, adapted in a raised position to support the plurality of solar panels hinged on each side of the framework with the solar panels rotated upward to a horizontal aspect;
   support apparatus hinged to posts on each end of the framework, adapted in a raised position to support the one solar panel hinged on each end of the framework with the solar panels rotated upward to a horizontal aspect; and
   circuitry and wiring connecting the solar panels to a cable ending in a connector compatible with and connected to an inverter.

2. The electricity generating carport appliance of claim 1 wherein the rectangular base plate has corner regions of d'×d" matching the bottom of each post, with lengthwise and widthwise spans of a span width equal to or less than d" forming edges of the baseplate.

3. The electricity generating carport appliance of claim 2 having a minimum clearance of six feet to the rectangular top, the ends have a minimum width of six feet between posts and the sides have a minimum length between posts equal to or greater than six feet, such that vehicles may be driven over spans of the baseplate and through the length or the width of the carport or may be parked under the carport.

4. The electricity generating carport appliance of claim 1 further comprising four removable wheel assemblies joined one to each corner post at a lowermost portion of each post such that installing all four wheel assemblies raises the carport appliance a distance D, and enables the carport to be rolled on the wheels of the wheel assemblies.

5. The electricity generating carport appliance of claim 1 further comprising an anchor plate fastened from span to span across each corner of the baseplate inside the post at each corner with a pattern of holes accommodating anchor bolts.

6. The electricity generating carport appliance of claim 5 further comprising anchors compatible with the anchor bolts, the anchors installed in the support surface in a pattern matching the pattern of the holes in all four anchor plates installed on the framework, enabling the carport appliance to be rolled over the pattern of anchors in the support surface, the wheel assemblies to be removed setting the carport down on the support surface, and the anchor bolts to be inserted through the holes in the anchor plates and engaged to the anchors, firmly anchoring the carport appliance to the support surface.

7. The electricity generating carport appliance of claim 1 wherein d=4 inches.

8. The electricity generating carport appliance of claim 1 wherein there are a minimum of two solar panels in the plurality of solar panels mounted to the top of the rectangular framework, two solar panels in the plurality of solar panels hinged along a long edge of each solar panel to a top edge of each side of the framework, and one solar panel hinged on each end of the framework, totaling nine solar panels connected in the carport appliance.

9. The electricity generating carport appliance of claim 1 wherein the cross beams at the upper ends of the posts forming a rectangular top to the framework comprise 4"×4" L-shaped cross beams along each side at the top and 2"×2" or 4"×4" L-shaped cross beams across each end at the top.

10. The electricity generating carport appliance of claim 9 further comprising 4"×4" angled braces from the cross beams along each side to the posts at each corner.

11. The electricity generating carport appliance of claim 1 wherein the support apparatus hinged to posts on each side of the framework adapted in a raised position to support the plurality of solar panels hinged on each side of the framework with the solar panels rotated upward to a horizontal aspect, each comprise two arms, each arm hinged to posts at each end of a side at a point below the top and above the base plate, and a lateral bar joined to ends of the arms away from the posts.

12. The electricity generating carport appliance of claim 11 wherein the arms are of 4"×4" square tubing, each hinged to the post, and the bracket has two locking pins that engages two holes in the arm when the arm is raised, positioning the lateral bar to support the hinged solar panels on the side in a horizontal plane, coplanar with the solar panels on the top.

13. The electricity generating carport appliance of claim 1 wherein the support apparatus hinged to posts on each end of the framework adapted in a raised position to support the single solar panel hinged on each end of the framework with the solar panels rotated upward to a horizontal aspect, each comprise two arms, each arm hinged to posts at each side of an end at a point below the top and above the base plate, and a lateral bar joined to ends of the arms away from the posts, the lateral bar adapted to engage the solar panel in the raised aspect.

14. The electricity generating carport appliance of claim 1 wherein the solar panels are bifacial panels in which both sides of the panels are active.

15. The electricity generating carport appliance of claim 4 wherein each wheel assembly comprises a first and a second L-bracket each the width of a post mounted securely to opposite sides of the post at different heights, a third L-bracket wider than the post having holes at a angle though the third L-bracket in portions outside the width of the post, and a fourth L-bracket wider than the post engaged beneath the second L-bracket and having holes in regions outside the posts matching the holes in the third L-bracket, at the angle of the holes in the third L-bracket, the fourth L-bracket having a universal caster with a wheel mounted facing down, with threaded rods and nuts coupling the third and fourth L-brackets through the angled holes, such that tightening the nuts on the threaded rods draws the fourth L-bracket down against the second L-bracket, lowering the caster wheel against the support surface and raising the carport on the wheel.

16. The electricity generating carport appliance of claim 1 wherein the inverter is a combination inverter/charger having cables and connectors for charging electric vehicles.

17. The electricity generating carport appliance of claim 16 wherein the inverter is connected electrically to house or business wiring, and with the framework deployed and the solar panels exposed to sunlight the system provides electric power to the home or business, to a connected public or private grid, or to charge electric vehicle batteries.

18. The electricity generating carport appliance of claim 1 wherein the electronic components are interconnected with the electric grid by means of a standard plug-in connector through an electrical outlet.

* * * * *